(12) United States Patent
Cui et al.

(10) Patent No.: US 10,979,286 B2
(45) Date of Patent: Apr. 13, 2021

(54) METHOD, DEVICE AND COMPUTER PROGRAM PRODUCT FOR MANAGING DISTRIBUTED SYSTEM

(71) Applicant: EMC IP Holding Company LLC, Hopkinton, MA (US)

(72) Inventors: Wei Cui, Shanghai (CN); Junping Zhao, Beijing (CN); Huan Chen, Beijing (CN); Brown Zan Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/173,099

(22) Filed: Oct. 29, 2018

(65) Prior Publication Data
US 2019/0173739 A1     Jun. 6, 2019

(30) Foreign Application Priority Data
Oct. 27, 2017   (CN) .......................... 201711025186.6

(51) Int. Cl.
*H04L 12/24*     (2006.01)
*H04L 12/26*     (2006.01)
*H04L 12/751*    (2013.01)

(52) U.S. Cl.
CPC .......... *H04L 41/0668* (2013.01); *H04L 41/04* (2013.01); *H04L 43/0817* (2013.01);
(Continued)

(58) Field of Classification Search
CPC ............. H04L 41/0668; H04L 41/0893; H04L 43/0817; H04L 41/04; H04L 43/10
(Continued)

(56) References Cited

U.S. PATENT DOCUMENTS

| 7,587,465 B1* | 9/2009 | Muchow ............... G06F 9/5061 709/208 |
| 2005/0237926 A1* | 10/2005 | Cheng ................. H04L 43/0817 370/216 |

(Continued)

OTHER PUBLICATIONS

"A New Heartbeat Mechanism for Large-Scale Cluster"—Lu et al, School of Computer, National University of Defense Technology, Apr. 2006 https://link.springer.com/content/pdf/10.1007%2F11610496_81.pdf (Year: 2006).*

*Primary Examiner* — Randy A Scott
(74) *Attorney, Agent, or Firm* — Ryan, Mason & Lewis, LLP

(57) ABSTRACT

Embodiments of the present disclosure relate to a method, a device and a computer program product for managing a distributed system. The method comprises sending heartbeat messages from a master node to a plurality of slave nodes, the master node and the plurality of slave nodes being included in a plurality of nodes in the distributed system, and the plurality of nodes being divided into one or more partitions. The method further comprises, in response to receiving a response to the heartbeat messages from a portion of slave nodes in the plurality of slave nodes, determining respective states of the one or more partitions. In addition, the method further comprises a state of a first slave node in the plurality of slave nodes at least based on the respective states of the one or more partitions, the master node failing to receive a response to the heartbeat messages from the first slave node.

20 Claims, 6 Drawing Sheets

(52) U.S. Cl.
CPC .............. *H04L 43/10* (2013.01); *H04L 45/02* (2013.01); *H04L 41/0893* (2013.01); *H04L 41/12* (2013.01); *H04L 43/16* (2013.01)

(58) Field of Classification Search
USPC ......... 709/206, 207, 208, 219, 223; 711/111, 711/112, 114, 162
See application file for complete search history.

(56) References Cited

U.S. PATENT DOCUMENTS

| | | | |
|---|---|---|---|
| 2011/0167126 A1* | 7/2011 | Yim | H04W 72/121 709/211 |
| 2016/0188426 A1* | 6/2016 | Kousha | G06F 16/00 714/4.12 |
| 2017/0039082 A1* | 2/2017 | Ganesan | G06F 9/45558 |
| 2017/0373926 A1* | 12/2017 | Shang | H04L 41/0654 |

\* cited by examiner

METHOD, DEVICE AND COMPUTER PROGRAM PRODUCT FOR MANAGING DISTRIBUTED SYSTEM

RELATED APPLICATIONS

This application claims priority from Chinese Patent Application Number CN 201711025186.6, filed on Oct. 27, 2017 at the State Intellectual Property Office, China, entitled "METHOD, APPARATUS AND COMPUTER PROGRAM PRODUCT FOR MANAGING A DISTRIBUTED SYSTEM" the content of which is incorporated herein by reference in its entirety.

FIELD

Embodiments of the present disclosure generally relate to the field of distributed storage, and specifically relate to a method, a device and a computer program product for managing a distributed system.

BACKGROUND

In a distributed storage system, a consensus algorithm such as PAXOS algorithm or RAFT algorithm is often used to implement storage of critical data. The consensus algorithm permits a plurality of nodes to work collaboratively as a cluster, and when several nodes therein fail, the remaining nodes can still work well. For example, PAXOS/RAFT algorithm can provide consensus, self-maintained, and peer-to-peer replication-based key-value (KV) database service, and can tolerate no more than half of the nodes in the cluster failing. By using such high fault-tolerant algorithms, many unreliable or less-reliable systems can be used to store critical data. However, conventionally, an algorithm for ensuring data consensus may cause degradation of system performance in some cases.

SUMMARY

Embodiments of the present disclosure provide a method, a device and a computer program product for managing a distributed system.

According to a first aspect of the present disclosure, there is provided a method for managing a distributed system. The method comprises sending heartbeat messages from a master node to a plurality of slave nodes, the master node and the plurality of slave nodes being included in a plurality of nodes in the distributed system, and the plurality of nodes being divided into one or more partitions. The method further comprises, in response to receiving a response to the heartbeat messages from a part of the plurality of slave nodes, determining respective states of the one or more partitions. In addition, the method further comprises determining a state of a first slave node in the plurality of slave nodes at least based on the respective states of the one or more partitions, the master node failing to receive a response to the heartbeat messages from the first slave node.

According to a second aspect of the present disclosure, there is provided an apparatus for managing a distributed system. The apparatus comprises at least one processing unit and at least one memory. The at least one memory is coupled to the at least one processing unit and stores instructions for execution by the at least one processing unit. The instructions, when executed by the at least one processing unit, cause the device to perform acts comprising: sending heartbeat messages to a plurality of slave nodes, a master node including the device and the plurality of slave nodes being included in a plurality of nodes in the distributed system, and the plurality of nodes being divided into one or more partitions; in response to receiving a response to the heartbeat messages from a part of the plurality of slave nodes, determining respective states of the one or more partitions; and determining a state of a first slave node in the plurality of slave nodes at least based on the respective states of the one or more partitions, the device failing to receive a response to the heartbeat messages from the first slave node.

According to a third aspect of the present disclosure, there is provided a computer program product that is tangibly stored on a non-transient computer readable medium and includes machine-executable instructions. The machine-executable instructions, when being executed by a device, cause the device to perform any step of the method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements.

Throughout the drawings, the same or corresponding reference symbols are used to indicate the same or corresponding parts.

DETAILED DESCRIPTION OF EMBODIMENTS

Figure 1:
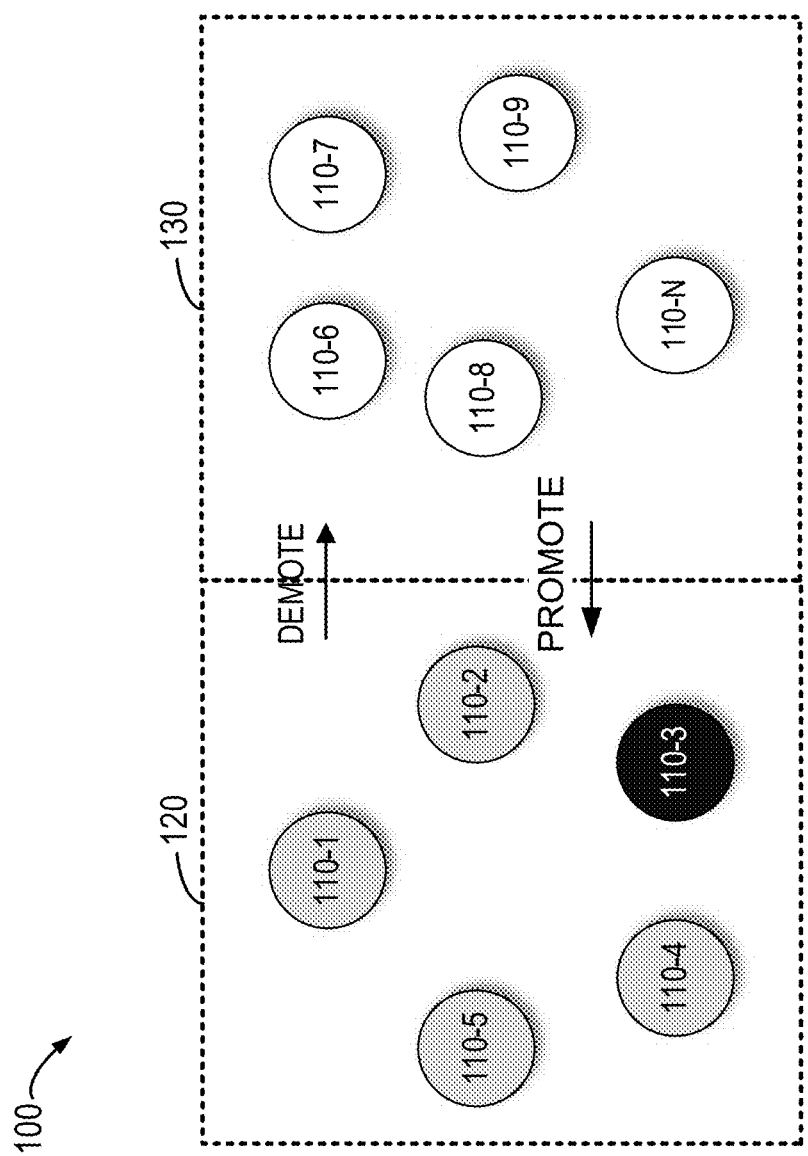
FIG. 1 illustrates a block diagram of a distributed system 100.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

As used herein, the term "node" may include a physical host, a server, a virtual machine, a container, a code snippet running in the above entities, or the like.

For purpose of illustration, embodiments of the present disclosure are described in detail in combination with K-RAFT algorithm. However, it is to be understood that this does not suggest any limitation to the scope of the present disclosure. The principles and methods of the present disclosure may be applied to any other consensus algorithm currently known or to be developed in the future. To facilitate understanding, basic principles of RAFT algorithm and K-RAFT algorithm are introduced briefly at first.

For ease of discussion, prior to the RAFT algorithm being introduced, the concept "consensus" will be introduced at first, which means that a plurality of nodes reach consensus in state. In a distributed system, due to various accidental possibilities, some nodes might fail or become unreliable, so they cannot reach a consensus state with other nodes. Hence, a consensus protocol may be needed to ensure fault tolerance, that is, the system can still work well even if some of the nodes in the system fail.

To reach a consensus in a fault-tolerant manner, RAFT algorithm does not require all nodes to reach a consensus state, so long as a more than half of the nodes reach consensus. In RAFT algorithm, any node may play one of the following roles at any time: a leader, a follower and a candidate. The leader is responsible for handling interaction with a client, synchronization management of logs (as described in the following, "logs" as used herein represent operation requests for the distributed system), keeping contact with the follower, and so on. The follower, as a passive node, responds to a log synchronization request from the leader, responds to a voting request from a candidate, and so on. The candidate is responsible for an election ballot. Upon the RAFT algorithm being initiated, all of the nodes are followers. Then, one node is transformed from a follower state to a candidate state and initiates an election. When the node obtains votes from a majority of the nodes, it is transformed from the candidate state to the leader state.

Once the leader is elected, it may begin to take charge of requests from the client. All of the transaction (updating operation) requests are handled by the leader. A transaction or operation request is also referred to as a "log". To ensure consensus of the nodes, in response to a log (transaction request) received from the client, the log entry may be recorded in a local log space at first. Then, the leader synchronizes the log entry to all of the followers by broadcasting a heartbeat message. When a follower receives the log entry, it may record the log entry in the local log space, and then send an acknowledgement message to the leader. Once receiving acknowledgement messages from a majority of the followers, the leader may commit the log entry to a local storage device, and send a response to the client. The leader will notify all of the followers in a next heartbeat message to commit the log entry to their respective local storage devices.

If network partition or network communication failure (hereinafter referred to as "isolation") happens during the above process so that the leader cannot access a majority of the followers, the leader may only update those followers it can access as usual. Because of loss of the leader, a majority of the followers will re-elect a candidate as a leader. If the network failure recovers, the original leader becomes a follower. In addition, any of the updating operations performed by the original leader during the network failure will be rolled back and updates by the new leader will be accepted.

Since the RAFT algorithm does not support automatic reconfiguration function such as automatic replacement of failed nodes, it at most can tolerate failures of less than half of the nodes. The K-RAFT algorithm, as an improved model of RAFT algorithm, can implement automatic reconfiguration by dividing nodes in the system into two groups and supporting demoting/promoting operation between the two groups of nodes. The principles of the K-RAFT algorithm will be described with reference to the distributed system as shown in FIG. 1.

FIG. 1 illustrates a schematic diagram of a distributed system 100. As shown in FIG. 1, the system 100 may include N nodes 110-1, 110-2, . . . 110-N (collectively called "nodes 110", where N is a natural number). N nodes may be divided into two groups: an election group 120 and a standby group 130.

As shown in FIG. 1, K nodes out of the N nodes may be divided into the election group 120. K is usually an odd number, which is much less than N. In FIG. 1, K equals to 5. K nodes from the election group 120 may be operated according to the conventional RAFT algorithm. As shown in FIG. 1, for example, node 110-3 in the election group 120 serves as a leader, while nodes 110-1, 110-2, 110-4 and 110-5 serve as followers. The remaining N−K nodes may be logically divided into the standby group 130. Nodes in the standby group 130 still keep heartbeat with the nodes in the election group 120. When a failed node is detected in the election group 120, a healthy node (e.g., which can respond to the heartbeat message) in the standby group 130 may be selected and promoted as a member of the election group 120, thereby maintaining sufficient redundancy of the system. Correspondingly, the failed nodes may be removed (also called "demoted") from the election group 120.

As automatic reconfiguration is facilitated, K-RAFT algorithm at most can tolerate failures of N−2 nodes. However, K-RAFT algorithm cannot be well adapted to a situation with a plurality of subnets.

Figure 2:
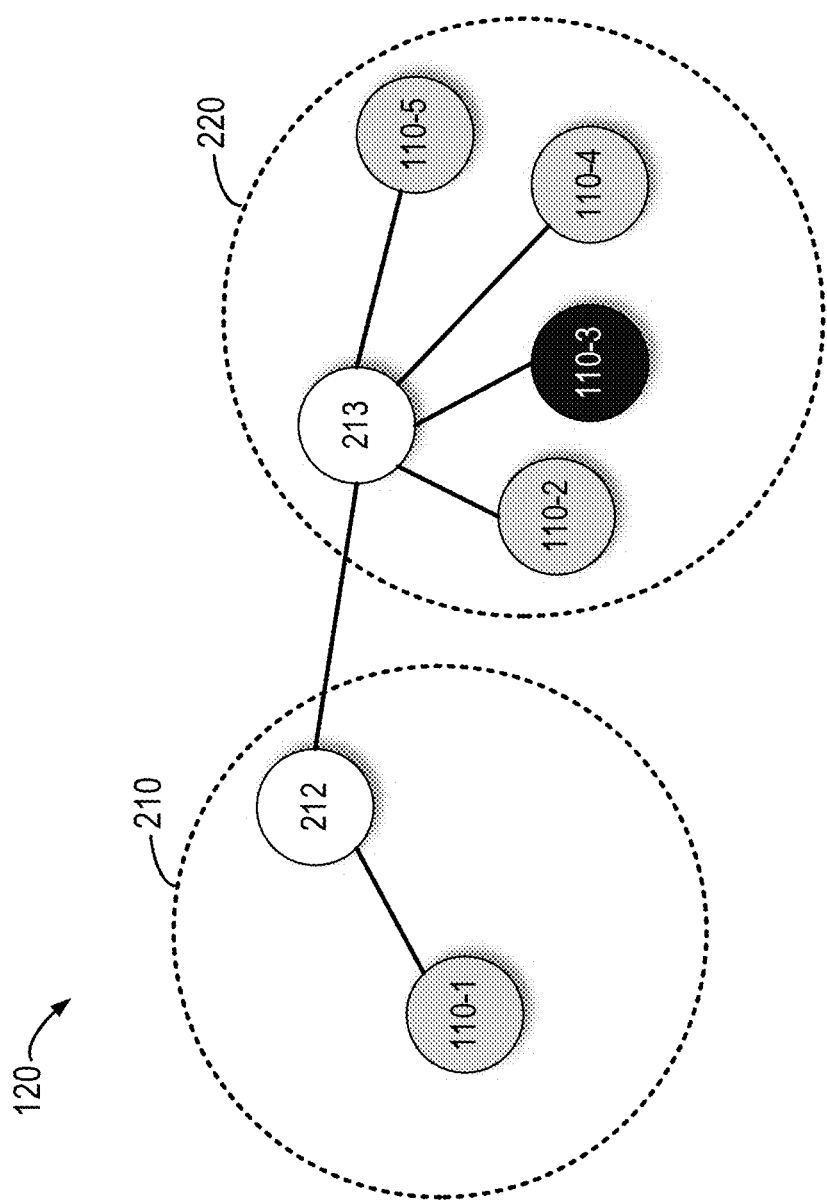
FIG. 2 illustrates a schematic diagram in which nodes in the distributed system 100 are divided into a plurality of partitions.

FIG. 2 illustrates a schematic diagram in which nodes in the election group 120 as shown in FIG. 1 are divided into a plurality of subnets. As shown in FIG. 2, for example, the node 110-1 is included in a subnet 210, while the nodes 110-2, 110-3, 110-4 and 110-5 are included in a subnet 220. When a relay device 212 or 213 (e.g., a switch or a router) between the subnets 210 and 220 fails, the node 110-1 might fail to respond to a heartbeat message from the node 110-3, thereby causing the node 110-1 to be removed from the election group 120. Correspondingly, a healthy node in the standby group 130 may be selected and join into the election group 120 so as to maintain sufficient redundancy of the system. When the relay device between the subnets repeatedly fails, the above kicking and joining will occur repeatedly, thereby causing a lot of data updating and data synchronizing operations, resulting in degradation of the system performance.

In addition, in case that the plurality of nodes in the distributed system are divided into a plurality of subnets, the occurrence of isolation might cause a node to get lost. For example, after a failed node recovers, it might fail to contact with other nodes and return to the distributed system because of failure to obtain the latest node list in the current distributed system. In the case of a single network, it is possible to avoid the loss of a node by broadcasting the latest node list in the current system to all of the nodes. However, this approach may not be adapted for the case in which there exist a plurality of subnets. In addition, some conventional schemes may utilize an individual external service to trace states of all of member nodes in the system. However, this centralized external service might cause degradation of availability of the system.

Exemplary embodiments of the present disclosure provide a scheme of managing a distributed system. This scheme considers a state of a subnet where a node is located when implementing automatic reconfiguration, thereby avoiding unnecessary node replacement operations due to short isolation between subnets. Accordingly, data migration during the node replacement operations can be avoided, thereby improving the system performance. This scheme enables a self-healing model with fewer environment limitations. For example, it can be better adapted to an environment in which there exist a plurality of subnets. In addition, exemplary embodiments of the present disclosure can implement decentralized node discovery, thereby avoiding degradation of system availability caused by utilizing an individual external service to trace states of all of the member nodes in the system in a multi-subnet environment.

Figure 3:
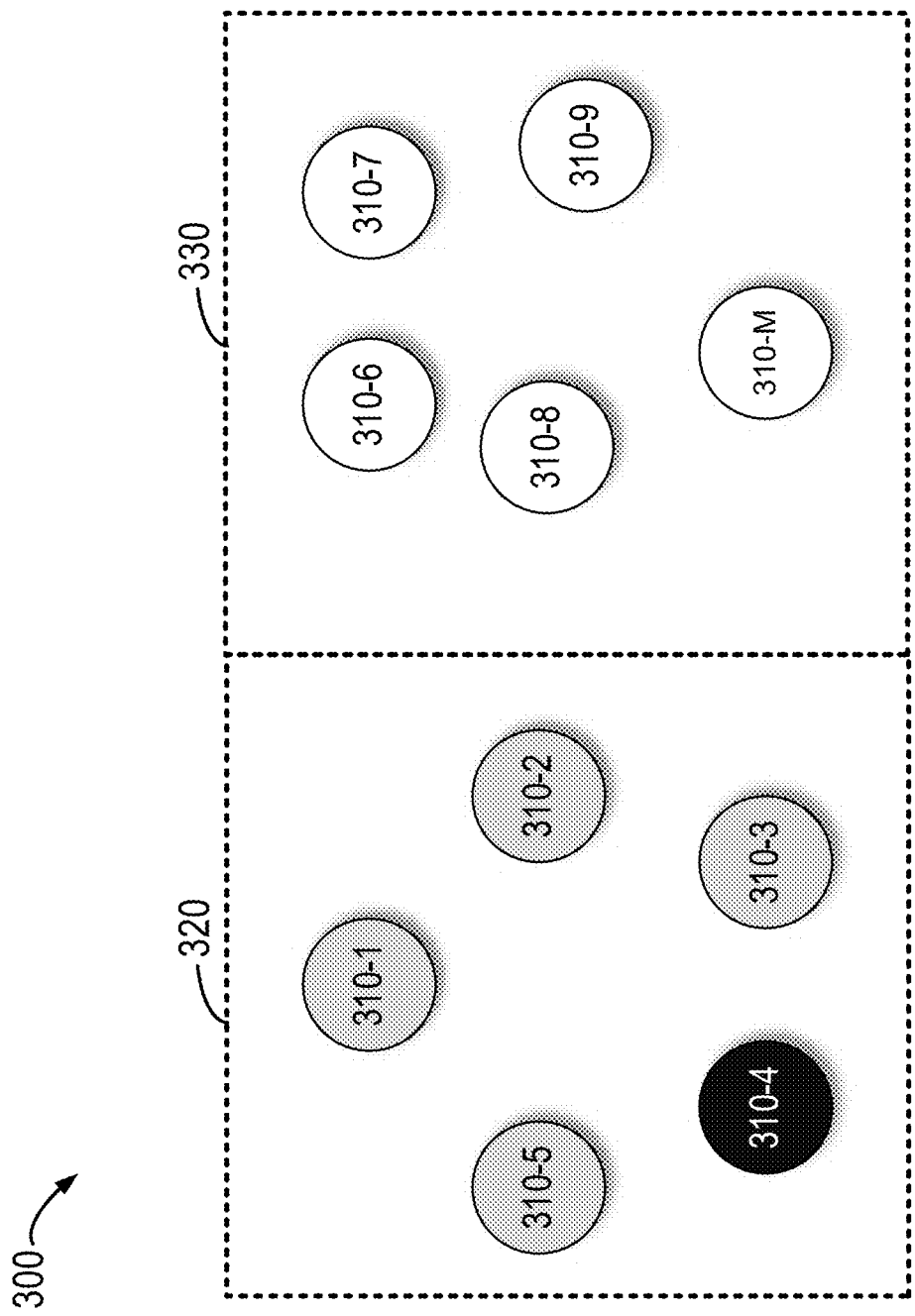
FIG. 3 illustrates a block diagram of a system 300 according to some embodiments of the present disclosure.

FIG. 3 illustrates a block diagram of a distributed system 300 according to some embodiments of the present disclosure. As shown in FIG. 3, the system 300 may include M nodes 310-1, 310-2, . . . 310-M (collectively called "node 310", wherein M is a natural number). It should be appreciated that the structure and function of the distributed system 300 shown in FIG. 3 are only for illustrative proposes and do not imply any limitations of the scope of the present disclosure. Embodiments of the present disclosure may be reflected in different structures and/or functions.

As shown in FIG. 3, M nodes may be divided into two groups: a consensus making group 320 and a standby group 330. P nodes in the M nodes may be directed into the consensus making group 320. In some embodiments, P may be an odd number much smaller than M. For example, in FIG. 3, P is equal to 5. Similar to FIG. 1, the P nodes in the consensus making group 320 may be operated according to a conventional RAFT algorithm, and P nodes may be configured with member information (e.g., node list) of all nodes in the distributed system 300. In some embodiments, the node 310-4 in the consensus making group 320 may serve as a master node (e.g., a leader in the RAFT algorithm), whereas nodes 310-1, 310-2, 310-3 and 310-5 may serve as slave nodes (e.g., followers in the RAFT algorithm). The remaining M-P nodes may be logically directed into the standby group 330. In some embodiments, the nodes in the standby group 330 may maintain heartbeat with nodes in the consensus making group 320. When malfunctioning nodes are detected in the consensus making group 320 and specific conditions are satisfied, healthy nodes in the standby group 330 may be selected and promoted as members in the consensus making group 320, and correspondingly, the malfunctioning nodes may be removed from the consensus making group 320.

Figure 4:
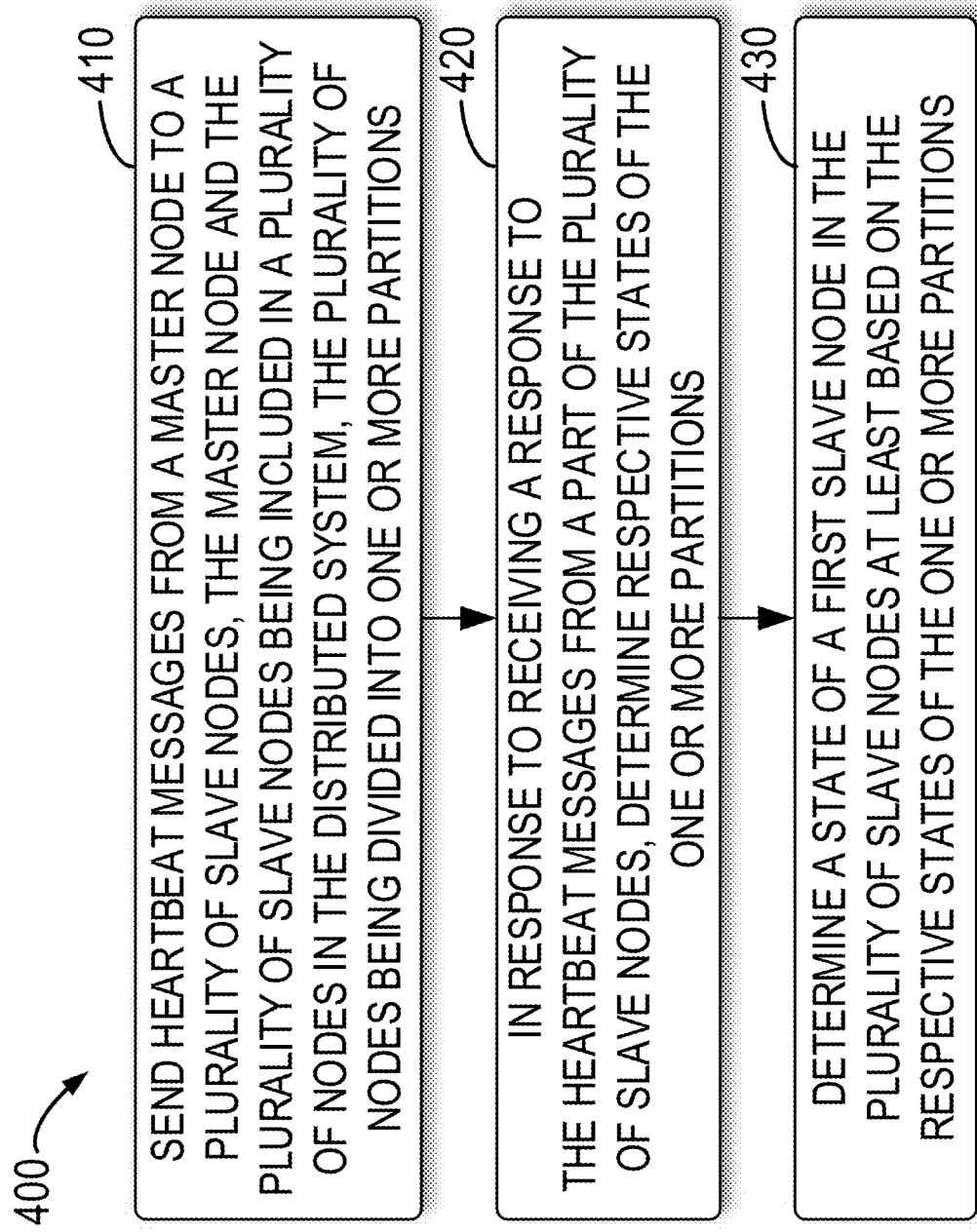
FIG. 4 illustrates a flow chart of a method 400 for managing a distributed system according to some embodiments of the present disclosure.

FIG. 4 illustrates a flow chart of a method 400 for managing a distributed system according to the embodiment of the present disclosure. The method 400 is described in detail with reference to FIG. 3. For example, the method 400 may be executed by the master node 310-4 shown in FIG. 3. It should be appreciated that the method may further comprise additional steps not shown and/or shown steps may be omitted. The scope of the present disclosure is not limited in this aspect.

In block 410, the master node 310-4 in the consensus making group 320 in the distributed system 300 may send a heartbeat message to a plurality of slave nodes 310-1, 310-2, 310-3 and 310-5 in the consensus making group 320. For example, nodes 310-1, 310-2, . . . and 310-5 may be directed into one or more partitions (e.g., one or more subnets). Additionally or alternatively, the master node 310-4 may send a heartbeat message to nodes in the standby group 330, so that the consensus making group 320 maintains contact with the standby group 330.

In some embodiments, when the distributed system 300 is built, each node in the node 310 needs to be registered into a node list associated with the distributed system 300. In a conventional scheme, a registration procedure usually requires newly adding an IP address of the node, and therefore the node list may be represented with an IP address list of nodes. For example, assuming that IP address of nodes 310-1, 310-2, . . . 310-M are IP 1, IP 2, . . . IP M respectively, the node list may be represented as <IP 1, IP 2, . . . IP M>. In some embodiments of the present disclosure, in order to obtain information of the partition where the node lies, when the node is registered into the node list associated with the distributed system 300, in addition to the IP address of the node, the registration procedure further requires connection information about the node. For example, the connection information about the node may include a length (e.g., the number of bits) of a subnet mask associated with the node, the subnet mask itself or a gateway address. Assuming that the connection information associated with nodes 310-1, 310-2, . . . 310-M are represented as parameter 1, parameter 2, . . . parameter M respectively, correspondingly the node list associated with the distributed system 300 may be expanded as: <(IP 1, parameter 1), (IP 2, parameter 2), . . . (IP M, parameter M)>.

In some embodiments, each node 310 may be pre-configured in the node list associated with the distributed system 300, and the node list may be updated in subsequent operations. For example, the master node may send, in the heartbeat message, a current latest node list to other nodes. Through the connection information included in the node list and related to each node, the master node 310-4 may pre-determine a partition where each slave node in a plurality of slave nodes in the consensus making group 320 lies.

In block 420, the master node 310-4, in response to receiving a response to the heartbeat message from a portion of slave nodes in the consensus making group 320, determines a corresponding state of one or more partitions where the plurality of slave nodes 310-1, 310-2, 310-3 and 310-5 lie. For purpose of illustration, it is assumed here that the master node 310-4 can receive a response from nodes 310-2, 310-3 and 310-5, and fails to receive a response from the slave node 310-1.

In some embodiments, the master node 310-4 may, based on the response received from the portion of slave nodes (namely, nodes 310-2, 310-3 and 310-5), determine at least one partition where the portion of slave nodes lie. For example, the response received from each slave node in the portion of slave nodes may include connection information about the slave node. The connection information about the slave node may include a length (e.g., the number of bits) of a subnet mask associated with the slave node, the subnet mask itself or a gateway address. Hence, the master node 310-4 may determine the partition where the slave node lies, based on the connection information about the slave node.

Additionally or alternatively, in some embodiments, the master node 310-4 may be preconfigured with a node list associated with the distributed system 300. That is, the master node 310-4 may pre-determine the partition where each slave node of the plurality of slave nodes lies. When the master node 310-4 receives from the portion of slave nodes the response to the heartbeat message, the master node 310-4 may determine at least one partition where said portion of slave nodes lies.

In some embodiments, when the master node 310-4 already determines at least one partition where the portion of slave nodes responding to the heartbeat message lie, the master node 310-4 may determine a corresponding state of said at least one partition as an active state. The active state may indicate that the at least one partition is not isolated from more than a predetermined number of nodes in consensus making group 320. For example, the predetermined number is half of the number of nodes in the consensus making group 320. That is to say, the active state may indicate that the at least one partition is not isolated from more than half of the number of nodes in the consensus making group 320.

In this way, when at least one slave node in one partition can respond to the heartbeat message sent by the master node, the partition may be considered as being active.

In block 430, the master node 310-4 determines a state of at least one slave node in the plurality of slave nodes, at least based on the determined corresponding state of one or more partitions.

In some embodiments, at least one slave node may include a slave node (e.g., slave node 310-1) that fails to receive therefrom a response to the heartbeat message. In the text hereunder, the slave node that fails to receive therefrom the response to the heartbeat message is also called "a first slave node".

In some embodiments, the master node 310-4 may pre-obtain a list of all nodes in the consensus making group 320. In addition, in block 420, the master node 310-4 may determine at least a portion of slave nodes (e.g., nodes 310-2, 310-3 and 310-5) that respond to the heartbeat message, so the master node 310-4 may determine the first slave node (e.g., node 310-1) that fails to respond to the heartbeat message.

In some embodiments, when the master node 310-4 determines that the slave node 310-1 is located in at least one partition that is in the active state, the master node 310-4 may determine the state of the node 310-1 as an non-isolated state (hereinafter referred to as "a first state"). The non-isolated state may indicate that the slave node 310-1 is not isolated from more than a predetermined number of nodes in the consensus making group 320, that is, the non-isolated state indicates that a reason why the slave node 310-1 does not respond to the heartbeat message is not network partition or network failure, but probably a malfunction of the slave node 310-1 itself.

In some embodiments, when the slave node 310-1 is in the first state, the master node 310-4 may further determine a duration (hereinafter referred to as "a first duration") that the slave node 310-1 is in the first state. For example, the master node 310-4 may periodically send the heartbeat message to the plurality of slave nodes in the consensus making group 320, and make statistics of times that the slave node 310-1 is continuously in the non-isolated state (namely, fail to respond to the heartbeat message and is located in the partition in the active state). For example, the first duration may be represented with the times. When the master node 310-4 may determine the state of the slave node 310-1 as a failed state.

In some embodiments, when the master node 310-4 determines that the slave node 310-1 is located outside at least one partition that is in the active state, the master node 310-4 may determine the state of the node 310-1 as an isolated state (hereinafter referred to as "a second state"). The isolated state may indicate that the slave node 310-1 is isolated from more than a predetermined number of nodes in the consensus making group 320, that is to say, the isolated state indicates that a reason why the slave node 310-1 does not respond to the heartbeat message might be network partition or network failure, not a malfunction of the slave node 310-1 itself.

In some embodiments, when the slave node 310-1 is in a failed state, the master node 310-4 may further determine a duration that the slave node 310-1 is in the malfunctioning state. For example, when the duration that slave node 310-1 is in the malfunctioning state exceeds a predetermined threshold (hereinafter referred to as "a second threshold"), the master node 310-4 may mark the node 310-1 as to-be-demoted, to remove the node 301-1 from the consensus making group 320. Correspondingly, the healthy node in the standby group 330 may be selected and added into the consensus making group 320.

Additionally or alternatively, in some embodiments, the master node 310-4, at least based on the corresponding state of the determined one or more partitions, determines that at least one slave node in its state may further include a slave node (e.g., node 310-2) that is capable of receiving therefrom the response to the heartbeat message. In the text hereunder, the slave node that is capable of receiving therefrom the response to the heartbeat message is also called "a second node".

In some embodiments, the slave node 310-2 is previously in the failed state and is not marked as to-be-demoted (i.e., the duration in the failed state does not exceed the second threshold). In communication of this round of heartbeat messages, the master node 310-4 receives the response to the heartbeat message from the node 310-2 that is previously in the failed state, and thereby determines that the node 310-2 is in an active partition (namely, a partition in the active state). In this case, the master node 310-4 may change the state of the slave node 310-2 from the failed state to the isolated state, to indicate that the recovery of the slave node 310-2 might be caused by instability of the relay device between subnets.

In some embodiments, the slave node 310-2 is previously in the failed state and is marked as to-be-demoted. In the communication of this round of heartbeat messages, the master node 310-4 receives the response to the heartbeat message from the node 310-2 that is previously in the failed state, and thereby determines that the node 310-2 is in an active partition. In this case, the master node 310-4 may change the state of the slave node 310-2 from the failed state to a standby state, namely, the slave node 310-2 becomes a member of the standby group 330.

It can be seen based on the above depictions that embodiments of the present disclosure can infer a reason why the node does not respond to the heartbeat message, based on the state of the subnet where the node that does not respond to the heartbeat message lies. That is, embodiments of the present disclosure can determine the node's failure to respond to the heartbeat message is caused by partition isolation or caused by the malfunction of the node itself. When the node's failure to respond to the heartbeat message is caused by partition isolation (namely, in an "isolated state"), the node cannot be removed. When the node's failure to respond to the heartbeat message is not caused by partition isolation (namely, in a "non-isolated state"), an operation related to removal of the node is triggered. In this manner, the embodiments of the present disclosure can avoid unnecessary node substitution operations caused by transient isolation between subnets. Correspondingly, data migration during node substitution operations can be avoided, thereby improving the system performance.

In addition, in some other embodiments, if the master node 310-4 fails to receive the response to the heartbeat message from any node after block 410, the master node 310-4 may determines its own state as an untraceable state, which indicates that the master node 310-4 might be lost (i.e., lose contact with all other nodes in the distributed system 300). Processing of nodes in the untraceable state will be described below in more detail.

The node state transformation according to the embodiment of the present disclosure may be represented by using a state machine. For example, FIG. 5 illustrates a schematic diagram of a state machine 500 for transforming a node state according to some embodiments of the present disclosure.

Figure 5:
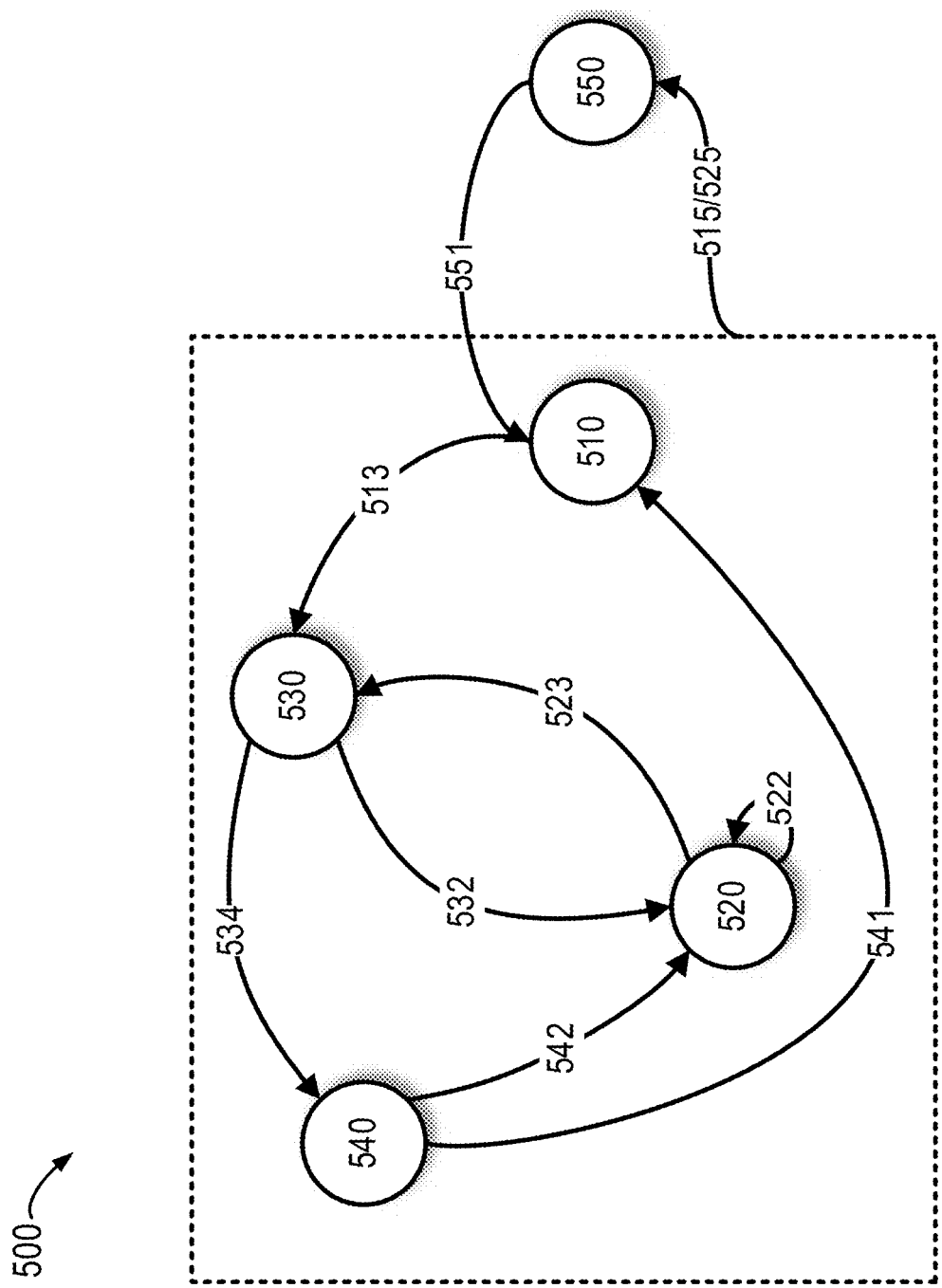
FIG. 5 illustrates a schematic diagram of a state machine 500 for transforming a node state according to some embodiments of the present disclosure.

As shown in FIG. 5, the state machine 500 may include five states: a standby state 510, an isolated state 520, a non-isolated state 530, a failed state 540 and an untraceable state 550. Each node 310 in the distributed system 300 as shown in FIG. 3 may be in one of the above five states. It should be appreciated that various states involved by the state machine 500 and conditions for transformation between states are only for illustrative purposes, and do not imply any limitations of the scope of the present disclosure. Embodiments of the present disclosure may be reflected in different state machines. In addition, it should be appreciated that embodiments of the present disclosure may be combined with operations in the RAFT algorithm and/or K-RAFT algorithm. However, to simplify depictions, operations in the RAFT algorithm and K-RAFT algorithm are not detailed any more here.

As shown in FIG. 5, for example when the duration that the node in the consensus making group 320 is in the failed state exceeds the second threshold, a node (e.g., node 310-6) that is in the standby group 330 and in the standby state 510 may be selected (e.g., voted by nodes in the consensus making group 320) as a member (condition 513) of the consensus making group 320. Hence, the state of the node 310-6 is transformed from the standby state 510 to the non-isolated state 530.

When the node 310-6 that is previously in the non-isolated state 530 fails to respond to the heartbeat message from the master node but is in the active partition, the node 310-6 continues to be in the non-isolated state 530. When the first duration that the node 310-6 is in the non-isolated state 530 exceeds a first threshold (condition 534), the state of the node 310-6 is transformed from the non-isolated state 530 to the failed state 540. On the contrary, when the node 310-6 that is previously in the non-isolated state 530 can respond to the heartbeat message from the master node, the first duration will be zero cleared, whereupon state transformation does not happen. When the node 310-6 that is previously in the non-isolated state 530 fails to respond to the heartbeat message from the master node and is outside the active partition (condition 532), the state of the node 310-6 transforms from the non-isolated state 530 to the isolated state 520.

When the node 310-6 that is previously in the isolated state 520 is in the active partition or can respond to the heartbeat message from the master node (condition 523), the state of the node 310-6 transforms from the isolated state 520 to the non-isolated state 530. When the node 310-6 that is previously in the isolated state 520 continues to be outside the active partition and cannot respond to the heartbeat message from the master node, the node 310-6 continues to be in the isolated state 520 (condition 522).

When the node 310-6 that is previously in the failed state 540 can respond to the heartbeat message from the master node and the second duration that the node 310-6 is in the failed state 540 does not exceed a second threshold (condition 542), the state of the node 310-6 transforms from the failed state 540 to the isolated state 520. When the node 310-6 that is previously in the failed state 540 can respond to the heartbeat message from the master node and the second duration that the node 310-6 is in the failed state 540 exceeds the second threshold (condition 541), the state of the node 310-6 transforms from the failed state 540 to the standby state 510.

In some embodiments, when the master node of the nodes 310 sends the heartbeat message to other nodes but fails to receive the response from any node (condition 515), or when the slave node in the node 310 loses contact with the master node and thereby initiates a new round of election with respect to the master node, but fails to receive the vote from an node (condition 525), the state of the master node or slave node that fails to receive the response from any node is transformed into the untraceable state 550, which indicates that the node might be lost.

To discover the node loss, the embodiment of the present disclosure supports a scheme of decentralized node discovery.

In some embodiments, when a plurality of the nodes in the distributed system are divided into a plurality of partitions, a partition-specific IP address may be allocated for each partition. Different from the node IP address registered into the node list, the partition-specific IP address is initially not occupied by any node of this partition, but used for fair competition by all nodes in the partition. A node successfully competing for the partition-specific IP address will not participate in the election operation in the RAFT algorithm, but only serves as a gateway in node discovery of the partition level (hereinafter referred to as "gateway node"). Therefore, even though the node occupying the partition-specific IP address changes, this will not cause any data migration and resultant reduction of system performance.

In some embodiments, an external discovery service may be used for node discovery of partition level. The external discovery service may be a specific node or a specific service running on the specific node. For example, the external discovery service may discover the gateway node with respect to each partition-specific IP address. The external discovery service may obtain the node list stored by the gateway node, from each gateway node in the discovered gateway nodes. The external discovery service may obtain the list of all nodes in the current distributed system by synchronizing obtained all node lists.

When the node in the distributed system is in the untraceable state 550, the node may first determine whether the gateway node occupying the partition-specific IP address exists in its network partition. For example, the node may attempt to contact with the partition-specific IP address. If a response can be obtained, the node may notify the gateway node of the latest node list retained before it is lost, so that the external service can discover the node by obtaining the node list from the gateway node. If a response is not obtained, the node may compete to occupy the partition-specific IP address, and notify the external discovery service of the latest node list retained before it is lost. In this manner, as shown in FIG. 4, when the external discovery service discovers a node in the untraceable state 550 (condition 551), the state of the node is transformed from the untraceable state 550 to the standby state 510.

It can be seen from the above depictions that embodiments of the present disclosure can implement the scheme of the decentralized node discovery. While solving the problem of node loss in the multi-subnet environment, this scheme will not cause unnecessary data migration and resultant reduction of system performance and thereby can ensure availability of the system.

To conclude, exemplary embodiments of the present disclosure propose a scheme of managing the distributed system. This scheme considers the state of the subnet where the node lies upon implementing an automatic reconfiguration function, and thereby can avoid unnecessary node substitution operations caused by transient isolation between subnets. Correspondingly, data migration during node substitution operations can be avoided, thereby improving the system performance. This scheme can implement a self-healing model with less environment limitations, e.g., it is better adapted for an environment in which there exists a plurality of subnets. In addition, the exemplary embodiment of the present disclosure can implement decentralized node discovery, and thereby avoid reduction of system availability caused by using an individual external service to trace states of all member nodes in the system in a multi-subnet environment. Considering various features and advantages of the embodiments of the present disclosure, embodiments of the present disclosure can be widely applied to various distributed applications and/or systems, including but not limited to cloud storage, block chain, mixed convergence system and various other modern distributed applications.

Figure 6:
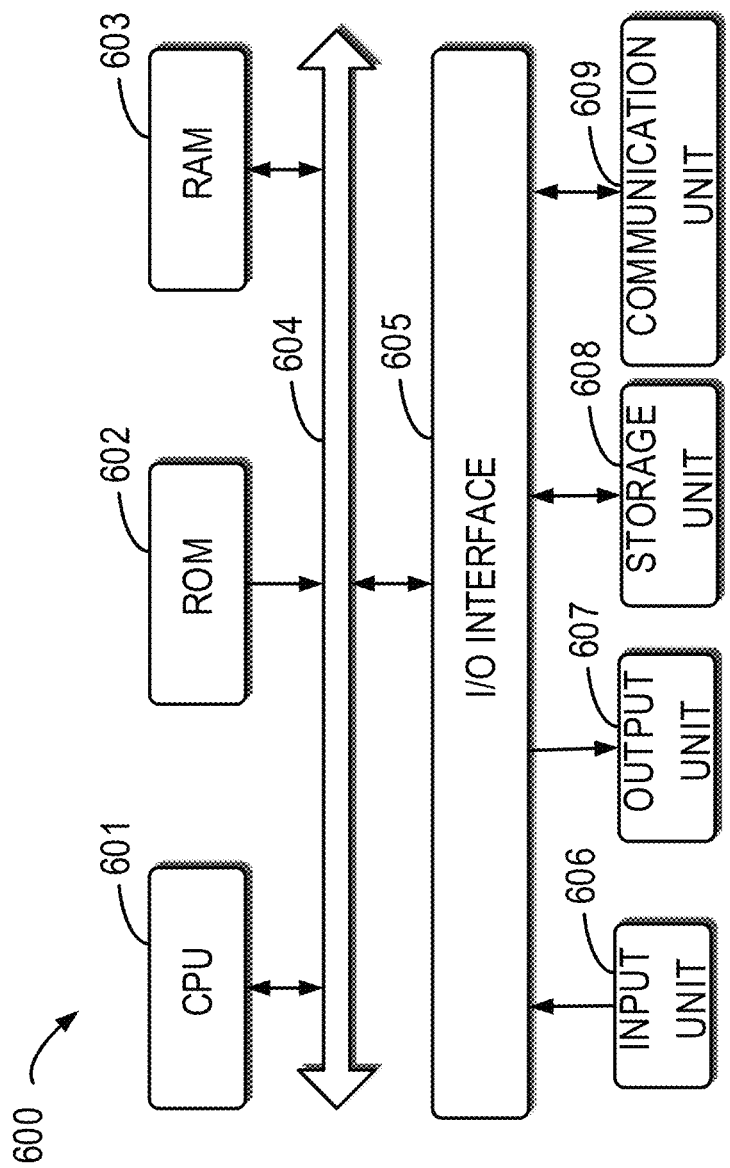
FIG. 6 illustrates a block diagram of an example device 600 adapted to implement some embodiments of the present disclosure.

FIG. 6 illustrates a block diagram of an example device 600 adapted to implement some embodiments of the present disclosure. For example, the nodes 310 in the distributed system 300 shown in FIG. 3 may be implemented by the device 600. As shown in the figure, the device 600 comprises a central processing unit (CPU) 601 that may perform various appropriate actions and processing based on computer program instructions stored in a read-only memory (ROM) 602 or computer program instructions loaded from a storage unit 608 to a random access memory (RAM) 603. The RAM 603 further stores various programs and data needed for operations of the device 600. The CPU 601, ROM 602 and RAM 603 are connected to each other via a bus 604. An input/output (I/O) interface 605 is also connected to the bus 604.

Various components in the device 600 are connected to the I/O interface 605, including: an input 606 such as a keyboard, a mouse and the like; an output unit 607 including various kinds of displays and a loudspeaker, etc.; a memory unit 608 including a magnetic disk, an optical disk, and etc.; and a communication unit 609 including a network card, a modem, and a wireless communication transceiver, etc. The communication unit 609 allows the device 600 to exchange information/data with other devices through a computer network such as the Internet and/or various kinds of telecommunications networks.

Various processes and processing described above, e.g., the method 400, may be executed by the processing unit 601. For example, in some embodiments, the method 400 may be implemented as a computer software program that is tangibly embodied on a machine readable medium, e.g., the storage unit 608. In some embodiments, part or all of the computer program may be loaded and/or mounted onto the device 600 via ROM 602 and/or communication unit 609. When the computer program is loaded to the RAM 603 and executed by the CPU 601, one or more steps of the method 400 as described above may be executed.

The present disclosure may be a method, apparatus, system and/or computer program product. The computer program product may include a computer readable storage medium on which computer readable program instructions for executing various aspects of the present disclosure are embodied.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for managing a distributed system, the method comprising:
   sending heartbeat messages from a master node to a plurality of slave nodes, the master node and the plurality of slave nodes being included in a plurality of nodes in the distributed system, and the plurality of nodes being divided into a plurality of partitions, wherein one of the plurality of partitions comprises the master node and at least one of the slave nodes and another one of the plurality of partitions comprises one or more other slave nodes;
   in response to receiving a response to the heartbeat messages from a part of the plurality of slave nodes, determining respective states of the plurality of partitions; and
   determining a state of a first slave node in the plurality of slave nodes at least based on the respective states of the plurality of partitions, the master node failing to receive a response to the heartbeat messages from the first slave node;
   wherein determining the respective states of the plurality of partitions comprises:
   determining, based on the response received from the part of the plurality of slave nodes, at least one partition of the plurality of partitions where the part of the plurality of slave nodes locate; and
   determining a respective state of the at least one partition as an active state, the active state indicating that the at least one partition is not isolated from more than a predetermined number of nodes in the plurality of nodes; and
   wherein determining the state of the first slave node in the plurality of slave nodes at least based on the respective states of the plurality of partitions comprises:
   responsive to determining the respective state of the at least one partition as the active state, at least temporarily maintaining the first slave node in one of an isolated state and a non-isolated state, despite the master node failing to receive a response to the heartbeat messages from the first slave node, so as to temporarily prevent removal of the first slave node from a consensus making group that includes the master node.

2. The method according to claim 1, wherein the response received from the part of the plurality of slave nodes includes first information on the at least one partition, and determining the at least one partition comprises:
   determining the at least one partition based on the first information, the first information including at least one of second information on a subnet mask, and a gateway address.

3. The method according to claim 1, wherein determining the state of the first slave node further comprises:

in response to determining that the first slave node is located in the at least one partition, determining the state of the first slave node as a first state, the first state indicating that the first slave node is not isolated from more than the predetermined number of nodes in the plurality of nodes.

4. The method according to claim 3, wherein determining the state of the first slave node further comprises:
in response to determining that a first duration of the first slave node in the first state exceeds a first threshold, determining the state of the first slave node as a failed state.

5. The method according to claim 3, wherein determining the state of the first slave node further comprises:
in response to determining that the first slave node is outside the at least one partition, determining the state of the first slave node as a second state, the second state indicating that the first slave node is isolated from more than the predetermined number of nodes in the plurality of nodes.

6. The method according to claim 5, wherein the part of the plurality of slave nodes include a second slave node in the failed state, and the method further comprises:
in response to determining that a second duration of the second slave node in the failed state fails to exceed a second threshold, determining a state of the second slave node as the second state.

7. The method according to claim 6, wherein the distributed system further includes at least one node in a standby state for replacing a failed node in the plurality of nodes, and the method further comprises:
replacing a slave node in the plurality of slave nodes with the at least one node, wherein a duration of the slave node in the failed state exceeds the second threshold.

8. The method according to claim 7, further comprising:
in response to the second duration exceeding the second threshold, determining the state of the second slave node as the standby state.

9. An electronic device, comprising:
at least one processing unit;
at least one memory coupled to the at least one processing unit and storing instructions for execution by the at least one processing unit, the instructions, when executed by the at least one processing unit, causing the device to manage a distributed system by performing acts comprising:
sending heartbeat messages to a plurality of slave nodes, a master node including the device and the plurality of slave nodes being included in a plurality of nodes in the distributed system, the device being included in the master node, and the plurality of nodes being divided into a plurality of partitions, wherein one of the plurality of partitions comprises the master node and at least one of the slave nodes and another one of the plurality of partitions comprises one or more other slave nodes;
in response to receiving a response to the heartbeat messages from a part of the plurality of slave nodes, determining respective states of the plurality of partitions; and
determining a state of a first slave node in the plurality of slave nodes at least based on the respective states of the plurality of partitions, the device failing to receive a response to the heartbeat messages from the first slave node;
wherein determining the respective states of the plurality of partitions comprises:
determining, based on the response received from the part of the plurality of slave nodes, at least one partition of the plurality of partitions where the part of the plurality of slave nodes locate; and
determining a respective state of the at least one partition as an active state, the active state indicating that the at least one partition is not isolated from more than a predetermined number of nodes in the plurality of nodes; and
wherein determining the state of the first slave node in the plurality of slave nodes at least based on the respective states of the plurality of partitions comprises:
responsive to determining the respective state of the at least one partition as the active state, at least temporarily maintaining the first slave node in one of an isolated state and a non-isolated state, despite the master node failing to receive a response to the heartbeat messages from the first slave node, so as to temporarily prevent removal of the first slave node from a consensus making group that includes the master node.

10. The device according to claim 9, wherein the response received from the part of the plurality of slave nodes includes first information on the at least one partition, and determining the at least one partition comprises:
determining the at least one partition based on the first information, the first information including at least one of second information on a subnet mask, and a gateway address.

11. The device according to claim 9, wherein determining the state of the first slave node further comprises:
in response to determining that the first slave node is located in the at least one partition, determining the state of the first slave node as a first state, the first state indicating that the first slave node is not isolated from more than the predetermined number of nodes in the plurality of nodes.

12. The device according to claim 11, wherein determining the state of the first slave node further comprises:
in response to determining that a first duration of the first slave node in the first state exceeds a first threshold, determining the state of the first slave node as a failed state.

13. The device according to claim 11, wherein determining the state of the first slave node further comprises:
in response to determining that the first slave node is outside the at least one partition, determining the state of the first slave node as a second state, the second state indicating that the first slave node is isolated from more than the predetermined number of nodes in the plurality of nodes.

14. The device according to claim 13, wherein the of the plurality of slave nodes include a second slave node in the failed state, and the acts further comprise:
in response to determining that a second duration of the second slave node in the failed state fails to exceed a second threshold, determining a state of the second slave node as the second state.

15. The device according to claim 14, wherein the distributed system further includes at least one node in a standby state for replacing a failed node in the plurality of nodes, and the acts further comprise:
replacing a slave node in the plurality of slave nodes with the at least one node, wherein a duration of the slave node in the failed state exceeds the second threshold.

16. The device according to claim 15, wherein the acts further comprise:

in response to the second duration exceeding the second threshold, determining the state of the second slave node as the standby state.

17. A computer program product that is tangibly stored on a non-transient computer readable medium and includes machine-executable instructions, the machine-executable instructions, when being executed by a device, causing the device to manage a distributed system by performing:

sending heartbeat messages from a master node to a plurality of slave nodes, the master node and the plurality of slave nodes being included in a plurality of nodes in the distributed system, and the plurality of nodes being divided into a plurality of partitions, wherein one of the plurality of partitions comprises the master node and at least one of the slave nodes and another one of the plurality of partitions comprises one or more other slave nodes;

in response to receiving a response to the heartbeat messages from a part of the plurality of slave nodes, determining respective states of the plurality of partitions; and determining a state of a first slave node in the plurality of slave nodes at least based on the respective states of the plurality of partitions, the master node failing to receive a response to the heartbeat messages from the first slave node;

wherein determining the respective states of the plurality of partitions comprises:

determining, based on the response received from the part of the plurality of slave nodes, at least one partition of the plurality of partitions where the part of the plurality of slave nodes locate; and determining a respective state of the at least one partition as an active state, the active state indicating that the at least one partition is not isolated from more than a predetermined number of nodes in the plurality of nodes; and wherein determining the state of the first slave node in the plurality of slave nodes at least based on the respective states of the plurality of partitions comprises:

responsive to determining the respective state of the at least one partition as the active state, at least temporarily maintaining the first slave node in one of an isolated state and a non-isolated state, despite the master node failing to receive a response to the heartbeat messages from the first slave node, so as to temporarily prevent removal of the first slave node from a consensus making group that includes the master node.

18. The computer program product according to claim 17, wherein the response received from the part of the plurality of slave nodes includes first information on the at least one partition, and determining the at least one partition comprises:

determining the at least one partition based on the first information, the first information including at least one of second information on a subnet mask, and a gateway address.

19. The computer program product according to claim 17, wherein determining the state of the first slave node further comprises:

in response to determining that the first slave node is located in the at least one partition, determining the state of the first slave node as a first state, the first state indicating that the first slave node is not isolated from more than the predetermined number of nodes in the plurality of nodes.

20. The computer program product according to claim 19, wherein determining the state of the first slave node further comprises:

in response to determining that a first duration of the first slave node in the first state exceeds a first threshold, determining the state of the first slave node as a failed state.

* * * * *

UNITED STATES PATENT AND TRADEMARK OFFICE
CERTIFICATE OF CORRECTION

PATENT NO. : 10,979,286 B2
APPLICATION NO. : 16/173099
DATED : April 13, 2021
INVENTOR(S) : Wei Cui et al.

Page 1 of 1

It is certified that error appears in the above-identified patent and that said Letters Patent is hereby corrected as shown below:

In the Claims

Claim 14, Column 16, Line 52 please delete "wherein the of the" and insert therefor --wherein the part of the--

Signed and Sealed this
First Day of June, 2021

Drew Hirshfeld
*Performing the Functions and Duties of the*
*Under Secretary of Commerce for Intellectual Property and*
*Director of the United States Patent and Trademark Office*